United States Patent
Schoor et al.

(10) Patent No.: US 10,557,931 B2
(45) Date of Patent: Feb. 11, 2020

(54) RADAR MEASUREMENT METHOD WITH DIFFERENT FIELDS OF VIEW

(71) Applicant: Robert Bosch GmbH, Stuttgart (DE)

(72) Inventors: Michael Schoor, Stuttgart (DE); Benedikt Loesch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 440 days.

(21) Appl. No.: 15/319,417

(22) PCT Filed: Apr. 23, 2015

(86) PCT No.: PCT/EP2015/058753
§ 371 (c)(1),
(2) Date: Dec. 16, 2016

(87) PCT Pub. No.: WO2015/197223
PCT Pub. Date: Dec. 30, 2015

(65) Prior Publication Data
US 2017/0131393 A1 May 11, 2017

(30) Foreign Application Priority Data
Jun. 26, 2014 (DE) .......................... 10 2014 212 281

(51) Int. Cl.
*G01S 13/02* (2006.01)
*G01S 13/42* (2006.01)
(Continued)

(52) U.S. Cl.
CPC .......... *G01S 13/0209* (2013.01); *G01S 13/42* (2013.01); *G01S 13/584* (2013.01); *G01S 13/931* (2013.01)

(58) Field of Classification Search
CPC ...... G01S 13/02; G01S 13/0209; G01S 13/32; G01S 13/34; G01S 13/42; G01S 13/343;
(Continued)

(56) References Cited

U.S. PATENT DOCUMENTS 5,652,589 A   7/1997  Ono et al.
6,606,052 B1* 8/2003  Miyahara ............. G01S 13/343
                                                       342/107
(Continued)

FOREIGN PATENT DOCUMENTS

CN    1285627 A    2/2001
CN  101076741 A   11/2007
(Continued)

OTHER PUBLICATIONS

International Search Report dated Jul. 31, 2015, issued in the corresponding International Application PCT/EP2015/058753 filed Apr. 23, 2015.

*Primary Examiner* — Bernarr E Gregory
*Assistant Examiner* — Daniel P Malley, Sr.
(74) *Attorney, Agent, or Firm* — Norton Rose Fulbright US LLP; Gerard Messina

(57) ABSTRACT

An FMCW radar sensor and a method for localizing a radar target, in which FMCW radar measurements are performed with transmitting antennas having different fields of view which differ in terms of an aperture angle and/or a range, the measurements each encompassing temporally interleaved sequences of ramps, and measurements with different fields of view being temporally interwoven with one another; ambiguous values for the relative velocity of the radar target being determined from a position of a peak in a two-dimensional spectrum; phase relationships between spectral values of spectra being checked for agreement with phase relationships expected for several of the determined values of the relative velocity; and on the basis thereof an estimated value for the relative velocity of the radar target being selected from the determined periodic values of the relative velocity.

12 Claims, 3 Drawing Sheets

(51) Int. Cl.
*G01S 13/58* (2006.01)
*G01S 13/93* (2006.01)
*G01S 13/931* (2020.01)

(58) Field of Classification Search
CPC ........ G01S 13/345; G01S 13/50; G01S 13/58; G01S 13/536; G01S 13/583; G01S 13/584; G01S 13/93; G01S 13/931; G01S 7/35; G01S 7/352; G01S 7/354; G01S 2007/356; G01S 2013/0245
See application file for complete search history.

(56) References Cited

U.S. PATENT DOCUMENTS

| | | | |
|---|---|---|---|
| 2002/0044082 A1* | 4/2002 | Woodington | B60K 31/0008 342/70 |
| 2009/0219190 A1* | 9/2009 | Lehre | G01S 7/352 342/71 |
| 2011/0122013 A1 | 5/2011 | Takeya et al. | |
| 2011/0309968 A1* | 12/2011 | Reiher | G01S 7/354 342/70 |
| 2012/0235857 A1 | 9/2012 | Kim et al. | |
| 2014/0022111 A1* | 1/2014 | Kuehnle | G01S 13/584 342/109 |
| 2014/0327566 A1* | 11/2014 | Burgio | G01S 13/72 342/108 |
| 2014/0354470 A1* | 12/2014 | Kuo | G01S 7/35 342/200 |
| 2015/0331096 A1* | 11/2015 | Schoor | G01S 13/343 342/112 |
| 2016/0124075 A1* | 5/2016 | Vogt | G01S 7/023 342/13 |
| 2017/0176583 A1* | 6/2017 | Gulden | G01S 13/003 |

FOREIGN PATENT DOCUMENTS

| | | |
|---|---|---|
| DE | 102012008350 A1 | 10/2013 |
| EP | 0730166 A1 | 9/1996 |
| EP | 2060929 A1 | 5/2009 |
| JP | 2009288223 A | 12/2009 |
| WO | 2010115418 A2 | 10/2010 |

* cited by examiner

RADAR MEASUREMENT METHOD WITH DIFFERENT FIELDS OF VIEW

FIELD

The present invention relates to a method for localizing a radar target in which FMCW radar measurements are performed with transmitting antennas having different fields of view which differ in terms of an aperture angle and/or a range, received signals being mixed down to baseband signals.

BACKGROUND INFORMATION

The present invention relates in particular to a method of this kind in which, for at least two of the fields of view, the respective measurement is an angularly resolving measurement that is performed with different selections of several antennas used for transmission and/or for reception, a search for peaks in two-dimensional spectra of the baseband signals of the measurements of the respective fields of view being carried out in order to localize radar targets, and an angular position of a radar target localized in a respective field of view being determined on the basis of amplitudes and/or phases at the position of a peak, corresponding to the radar target, in two-dimensional spectra of the baseband signals which are obtained for the different selections of the antennas used for transmission and/or for reception.

The present invention further relates to a radar sensor, in particular for motor vehicles, that is configured to carry out this method.

In motor vehicles, FMCW radar sensors are used to detect the traffic environment, in particular to localize other vehicles.

The localization results can be used for a variety of assistance functions, for example for automatic separation control, automatic collision warning, or also automatic triggering of an emergency braking procedure in the case of an acute risk of collision.

In frequency modulated continuous wave (FMCW) radar sensors, a transmitted signal having a frequency modulated in ramp-shaped fashion is used. The signal is transmitted continuously during the course of the ramp. A baseband signal is generated from a received signal by mixing with the transmitted signal, and is sampled and evaluated.

The frequency of the baseband signal corresponds to the frequency difference between the signal transmitted at a given point in time and the signal received at the same point in time. Because of the frequency modulation of the transmitted signal, this frequency difference depends on the transit time of the signal from the radar sensor to the object and back, and thus on the distance of the object. Because of the Doppler effect, however, the frequency difference also contains a component that is conditioned by the relative velocity of the object. A measurement of the frequency difference on a single ramp therefore does not yet permit a determination of the distance and the relative velocity, but instead supplies only a linear relationship between those variables. This relationship can be depicted as a straight line on a distance-velocity diagram (d-v diagram).

There are conventional FMCW radar sensors that work with a sequence of identical, comparatively short ramps, called "rapid chirps," which have a large frequency swing in relation to their duration and are therefore so steep that the distance-dependent component of the frequency shift dominates in the baseband signal while the Doppler shift is sampled by the sequence of ramps. A sufficiently high repetition rate of the short ramps is therefore necessary in order to arrive at an unambiguous determination of the relative velocity within a measurement region of the relative velocity. In particular, the time offset between successive short ramps must be less than half the period length of the Doppler frequency.

The radar sensor usually has several antennas that are disposed with a spacing from one another on a line, for example a horizontal line, so that different azimuth angles of the localized objects result in differences in the path lengths traveled by the radar signals from the object to the respective antenna. These path length differences result in corresponding differences in the phase of the signals that are received by the antennas and evaluated in the associated evaluation channels. The angle of incidence of the radar signal, and thus the azimuth angle of the localized object, can then be determined by equalizing the (complex) amplitudes received in the various channels with corresponding amplitudes in an antenna diagram.

In a multiple input/multiple output (MIMO) radar, a greater angular resolution capability is achieved by the fact that not only several receiving antennas but also several transmitting antennas are worked with, different combinations of transmitting and receiving antennas being evaluated and resulting in respective differences in the path length of a reflected signal.

In a MIMO radar, the signals transmitted with different selections of the transmitting antennas must be orthogonal to one another or separable in time. This can be achieved, for example, by code multiplexing, frequency multiplexing, or time multiplexing. The code multiplexing method requires a great deal of outlay, however, and enables only limited signal orthogonality. With the frequency multiplexing method the disadvantage exists that the phase and the Doppler shift are dependent on the respective wavelength. With the time multiplexing principle the problem exists that relative motions of the localized objects, in conjunction with the time difference between the measurements with different switching states, result in phase differences that complicate subsequent angle estimation.

SUMMARY

An object of the present invention is to provide a method of the kind which permits better utilization of an available cycle time for sampling the different fields of view. When objects are to be localized in different but overlapping fields of view, for example in a field of view that exhibits a relatively large aperture angle with a limited range and in a field of view that exhibits a relatively long range with a limited aperture angle, this conventionally requires a long cycle time of a measurement cycle in order to sample all the fields of view in succession.

The object may be achieved according to the present invention by a method of the kind recited initially in which:

(a) in one measurement cycle for the different fields of view, a respective measurement is performed in which a transmitted signal frequency-modulated in ramp-shaped fashion is transmitted, the modulation pattern of which signal encompasses several temporally interleaved sequences of ramps which follow one another in time-offset fashion within the respective sequence at a time interval, the sequences of the measurements with different fields of view being temporally interwoven with one another, an alternation occurring in a regular pattern between the fields of view, for at least one of the fields of view, the measurement exhibiting a modulation pattern that exhibits at least two different, regularly recurring time offsets between ramps of different sequences having the same ramp index, which counts the ramps in the respective sequence, within the respective sequence, these time offsets differing from the time interval at which the ramps follow one another within a respective sequence;

(b) from the baseband signals a two-dimensional spectrum is calculated separately for each of the sequences by two-dimensional Fourier transformation, transformation occurring ramp for ramp in the first dimension and transformation occurring over the ramp index in the second dimension;

(c) for the at least one of the fields of view, based on a position of a peak in at least one two-dimensional spectrum of the baseband signals of the respective field of view, values for the relative velocity of a radar target detected in the respective field of view which are periodic with a predetermined velocity period are determined, (d) for the at least one of the fields of view, at least one phase relationship between spectral values that are obtained respectively at the same position in the separately calculated two-dimensional spectra of the field of view is checked for agreement with phase relationships expected for several of the determined periodic values of the relative velocity of the detected radar target; and (e) for the at least one of the fields of view, an estimated value for the relative velocity of the radar target detected in the respective field of view is selected, based on the result of the check, from the determined periodic values of the relative velocity.

The sequences are temporally interleaved with one another. In other words, the ramps of one sequence have ramps of the respective other sequences disposed in gaps between them. The term "interleaved with one another" is used here synonymously with the terms "intermeshed with one another" or "interwoven with one another."

Preferably, in step (c), based on a position of the peak in the first dimension of the at least one two-dimensional spectrum a linear correlation between the distance and the relative velocity of the radar target is determined, and based on a position of the peak in the second dimension of the at least one two-dimensional spectrum at least those values for the relative velocity of the radar target which are periodic with the predetermined velocity period are determined.

An undersampling of the Doppler shift frequency occurs over the sequence of ramps, so that the information obtained regarding the relative velocity is affected by an ambiguity. In particular, the value of the relative velocity is periodic with a velocity interval $$\Delta v = \frac{c}{2f_0 T_{r2r}} \quad (1)$$

where c is the speed of light, $f_0$ the average transmission frequency, and Tr2r the time interval between the ramps within a sequence. An ambiguity-affected value of the relative velocity of the radar target is therefore determined from a position of a peak, associated with the radar target, in a two-dimensional spectrum of the sampled baseband signals. The ambiguity can then be resolved by investigating how well those phase relationships between the signals of the sequences which are expected for the respective values of the relative velocity agree with the measured phase relationship. The expected phase relationship depends respectively on the relative velocity and on the time offset between the relevant sequences.

The at least two time offsets between the sequences, which differ respectively from the time interval Tr2r that is the same for all sequences of all fields of view, allow an unambiguous estimate of the relative velocity within a velocity measuring range that is at least a multiple of the unambiguity range of a measurement with only one of the sequences of ramps. This makes possible relatively long time intervals between the ramps, i.e., between the ramp center points, of a sequence, so that the measurements for the different fields of view can be temporally interwoven with one another and a more accurate localization is made possible for the same hardware outlay.

The ramps are preferably disposed at irregular spacings within a period of the modulation pattern whose length corresponds to the time interval Tr2r, so that the modulation pattern exhibits as little symmetry as possible despite the regular time interval Tr2r. Because of the uniform time interval Tr2r, the time offsets between the ramps of different sequences repeat from one period to another.

Preferably, in step (e) of selecting an estimated value for the relative velocity, the estimated value is unambiguously determined in a measurement range for the relative velocity, an upper maximum value $v_{max}$ of the measurement range being related as follows to the temporal spacing Tr2r of the ramp center points within a sequence:

$$Tr2r > c/(4f_0 v_{max})$$

where c is the speed of light and $f_0$ the average transmission frequency. This corresponds to an undersampling of a maximum relative velocity $v_{max}$ of a radar target which is to be detected, by way of the ramps of a sequence which succeed one another at the temporal spacing Tr2r. Preferably Tr2r is equal to at least a multiple of the aforesaid variable on the right side of the equation.

Preferably, in step (e) of selecting an estimated value for the relative velocity, the estimated value is unambiguously determined in a measurement range for the relative velocity, an upper maximum value $v_{max}$ of the measurement range being related as follows to a respective time offset T1i between ramps of different sequences:

$$T1i > c/(4f_0 v_{max})$$

Preferably T1i is equal to at least a multiple of the aforesaid variable on the right side of the equation.

Preferably the measurements with different fields of view each have a modulation pattern that exhibits at least two different, regularly recurring time offsets between ramps of different sequences.

Advantageous embodiments of the invention are described herein.

The different time offsets between sequences of a field of view can be provided in various ways:

For example, for at least one of the fields of view the measurement can exhibit a modulation pattern that encompasses at least three of the sequences for which the same antenna was used for transmission, those sequences exhibiting among themselves time offsets that are different with reference to a first of the sequences and are associated with a respective further one of the sequences. This is useful if only one transmitting antenna is available for a field of view.

For example, for at least one of the fields of view the measurement can be performed with several antennas used for transmission, at least two different transmission switching states, which differ in terms of selection of the antennas used for transmission, being used, those transmission switching states each having associated with them at least two of the sequences, which are temporally interleaved with one another and exhibit among themselves, with reference to a first of the sequences, a time offset associated with a respective further one of the sequences, for those different transmission switching states, different time offsets being associated with the further sequences, and a switchover occurring, between successive ramps of the measurement which are associated with different transmission switching states, between the relevant transmission switching states.

This measurement can be, for example, a MIMO FMCW measurement in which the angular position of a localized radar target is determined on the basis of amplitudes and/or phase relationships between baseband signals which are obtained for different selections of antennas of the radar sensor which are used for transmission and reception.

For example, for at least one of the fields of view the measurement described first is performed, which measurement exhibits a modulation pattern that encompasses at least three of the sequences for which the same antenna was used for transmission; and for at least one other of the fields of view the measurement described last, with several antennas used for transmission, can be performed.

In an angularly resolving measurement, antennas are disposed in various positions in a direction in which the radar sensor is angularly resolving. For example, several antennas are used for reception. For an ideal, approximately point-like radar target in a respective angular position, a characteristic phase relationship and amplitude relationship exists between the signals received in the various antennas. The amplitude ratios between the received signals depend on the directional angle and on the sensitivity curves of the antennas. It is possible to determine the angular position of a localized radar object by evaluating the phase relationships and/or by evaluating the amplitude relationships.

For a standard object at a given distance and having a given reflection intensity, the dependence of the amplitude and phase of the signal, transmitted from one antenna and received after reflection at the radar target at one antenna, on the angular position of the localized radar target can be depicted in an antenna diagram. The angular position of a radar target can be determined, for example, by equalizing the amplitudes and/or phases obtained for the same radar target from the various antennas, or (in the case of a MIMO measurement) for different selections of antennas used for transmission and reception, with the corresponding antenna diagrams.

Because the measurements of the different fields of view are temporally interwoven, they are sampled approximately simultaneously. Spectral values, i.e. amplitudes and/or phases, from the spectra of different fields of view can be used for a common angle estimate of a radar target if a radar target is located in an overlap region of fields of view. An equalization can be performed on lists, prepared separately for the fields of view, of localized radar targets or objects with which the radar targets are associated.

The present invention also provides features for angle estimation.

Preferably, successive ramps within a respective sequence have an identical ramp slope and an identical difference between their ramp center frequencies as well as, particularly preferably, an identical frequency swing, the aforesaid difference in the ramp center frequencies optionally being not equal to zero, and ramps that have the same ramp index in the respective sequences of measurements exhibiting the same ramp slope and the same ramp center frequency as well as, particularly preferably, an identical frequency swing. The phase relationships resulting from the relative velocity of a radar target can be measured particularly accurately if the frequency profile of all ramps of all sequences of all measurements is identical, except for the frequency difference from ramp to ramp which is optionally selected to be not equal to zero.

The available measurement time can be utilized particularly effectively if the time offset between the sequences and the temporal spacing of the ramps within a sequence are of the same order of magnitude. Influences of an object acceleration on the phase relationship between the baseband signals of the individual sequences can furthermore thereby be minimized. Favorable values for the time offset between the sequences and the temporal spacing of the ramps within a sequence, which values are as "incommensurable" as possible (i.e. for example are not multiples of one another), can furthermore thereby be selected. The modulation pattern accordingly contains pauses between the ramps. In particular, the modulation pattern preferably exhibits at least one pause that recurs regularly between each two successive ramps of a sequence, with a time interval from one pause to another which is equal to the time interval between the ramps of a sequence.

Preferably, ramps of the respective sequences are disposed alternately during a predominant time span of the modulation pattern, i.e. the sequences largely overlap in time. Preferably the respective time offset between sequences is less than twice the time interval between the ramps within a respective sequence, particularly preferably is less than that time interval. The latter is equivalent to saying that in a measurement of a field of view, one respective ramp of the respective further sequences of ramps is always transmitted between two successive ramps of the first sequence.

Preferably the two-dimensional spectra, calculated separately for each of the sequences, for a respective field of view are merged into one two-dimensional spectrum of the baseband signals, in particular into a power spectrum, that is used in step (c) of determining values for the relative velocity. The merger is, for example, non-phase-coherent, preferably a non-phase-coherent summation of the squares of the absolute values of the spectral values to yield a power spectrum. The detection of a peak can thereby be improved.

Preferably a relationship in accordance with the equation $$\Delta \varphi_{12} = 2\pi \frac{2}{c} f_0 T_{12} v \tag{2}$$

is used in the context of checking the phase relationship, which equation correlates a phase difference $\Delta \phi_{12}$ expected between a phase of the spectral value of the respective spectrum of a further sequence and a phase of the spectral value of the spectrum of the first sequence of the measurement for a field of view, with the time offset T12 associated with the further sequence and with the relative velocity v, where c is the speed of light and $f_0$ the average transmission frequency. Instead of T12 and $\Delta \phi_{12}$ for the second sequence it is possible to write generally T1$i,m,p$ or $\Delta \phi_{1i,m,p}$ for the i-th sequence where i>1, if applicable the m-th transmission switching state, and the p-th field of view.

A control vector a(v), dependent on the relative velocity v, of a measurement, according to the equation $$a(v) = \frac{1}{\sqrt{l}} \begin{vmatrix} 1 \\ M \\ e^{2\pi j \frac{2}{c} f_0 T_{1i} v} \end{vmatrix}, \quad (3)$$

is preferably used in the context of checking the phase relationship, where l is the number of sequences, i=1, ..., l counts the sequences, and in the i-th component of the vector T1$i$ (for i>1) is the time offset, associated with the i-th sequence, with respect to the first sequence. In this notation the control vector a(v) is a column vector whose components respectively describe the expected phase difference of the i-th sequence with respect to the partial measurement of the first sequence, the expected phase difference being respectively determined as a phase of a complex exponential function. The number of components of the vector is l. The common pre-factor is a normalization factor. In the exponent of the exponential function, j designates the imaginary unit unless otherwise indicated. Instead of a(v) and T1$i$ it is possible to write generally a(v,m,p) or T1$i,m,p$ for, if applicable, the m-th transmission switching state and for the p-th field of view, l being replaced by a number $l_p$ for respective fields of view p.

A knowledge of the control vector a(v) makes it possible to create an (under suitable conditions, unambiguous) relationship between the relative velocity v of the radar target and the received complex spectral values at the position of the peak, and to infer, from the phase relationships of the received signals, the relative velocity v of the radar target. But because in practice the received signals are more or less affected by noise, the velocity cannot be exactly calculated but can only be estimated, for example with the aid of a maximum likelihood estimate. This is carried out separately for the different fields of view.

A measurement vector is defined, for example for one reception channel n, if applicable a transmission switching state m, and a field of view p, as $$a_{k,l}(n, m, p) = \begin{vmatrix} x_l(n, m, p) \\ M \\ x_{l_p}(n, m, p) \end{vmatrix}, \quad (4)$$

where i=1, ..., $l_p$, in the i-th component of the vector $x_i(n)$ designates a complex spectral value of the two-dimensional spectrum of the of the sampled baseband signals of the i-th sequence of ramps of the reception channel n, where n counts the reception channels such that n=1, ..., N for N reception channels.

Preferably, in step (d), in the case of interference in the phase relationship between the aforesaid spectral values which corresponds to a situation in which two radar targets having different relative velocities occupy the same position in the at least one two-dimensional spectrum, the presence of the interference is recognized from the fact that an expected degree of agreement between the phase relationship and the expected phase relationships is not achieved.

BRIEF DESCRIPTION OF THE DRAWINGS

Exemplifying embodiments are explained in further detail below with reference to the figures.

DETAILED DESCRIPTION OF EXAMPLE EMBODIMENTS

Figure 1:
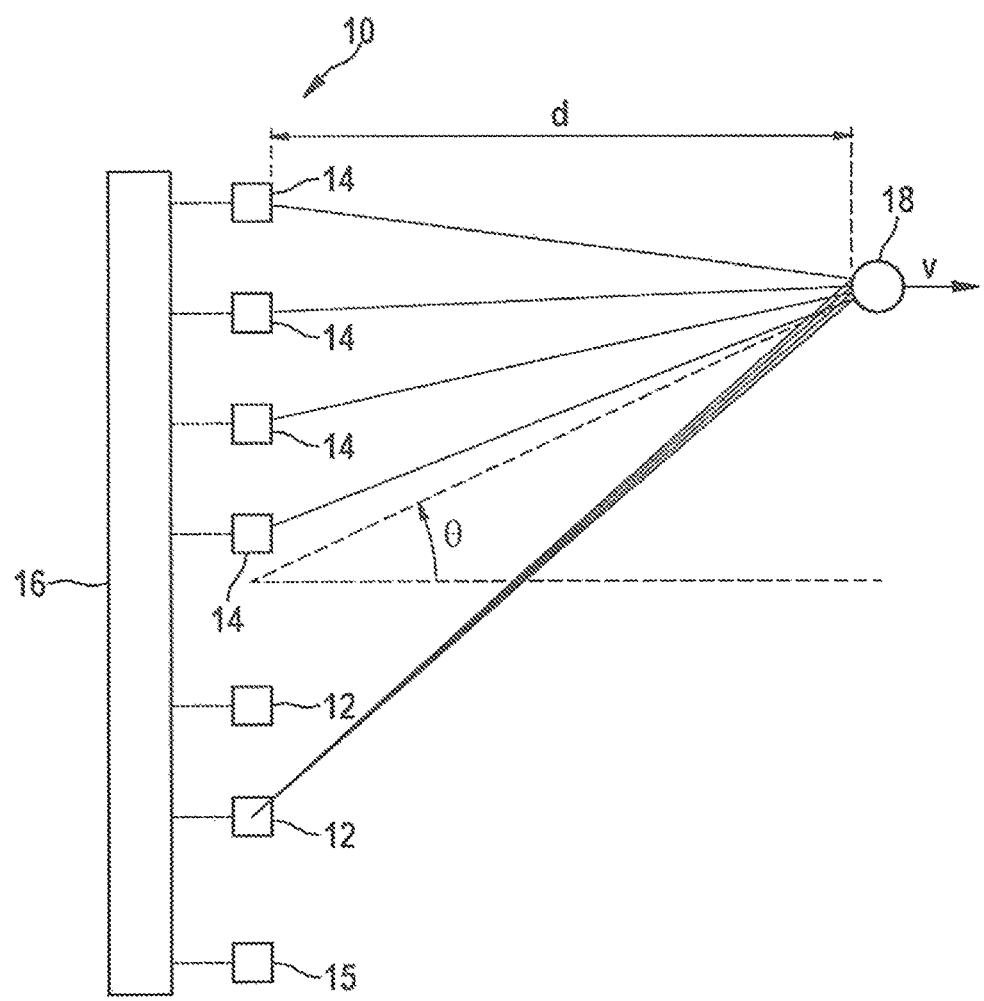
FIG. 1 is a diagram of an FMCW radar sensor having two transmitting antennas and four receiving antennas for MIMO radar measurements, as well as a further transmitting antenna.

FIG. 1 is a diagram of a simple example of a (MIMO) FMCW radar sensor 10 that in this example has two transmitting antennas 12 and four receiving antennas 14 for MIMO measurements in a first field of view, as well as a further antenna 15 having a different field of view. Larger numbers of antennas are possible in practice. Transmitting antennas 12, 15 are powered by a control and evaluation unit 16 and emit radar signals that are reflected at an object 18 and received by each of the receiving antennas 14. The field of view of transmitting antenna 15 has a greater range and a narrower aperture angle than the field of view of transmitting antennas 12. The transmitting and receiving antennas can each be made up of a patch antenna array.

The received signals are mixed down to baseband signals and evaluated in control and evaluation unit 16. Radar sensor 10 is installed, for example, at the front in a motor vehicle and serves to measure distances d, angles, and relative velocities v of objects 18, for example of preceding vehicles. The frequency of the transmitted signal is modulated within one radar measurement with sequences of rising or falling ramps.

A bistatic antenna system, in which transmitting antennas 12, 15 are different from receiving antennas 14, has been depicted here simply in the interest of clarity. A monostatic antenna concept, in which the same antennas are used in each case for transmission and reception, can also be used in practice.

Antennas 12, 14 are disposed in different positions in a direction in which radar sensor 10 is angularly resolving. In this example, receiving antennas 14 are disposed at regular spacings on a straight line (uniform linear array; ULA). The same also applies to transmitting antennas 12; the transmitting and receiving antennas do not necessarily need to be disposed on the same straight line. If the radar sensor is to be used to measure azimuth angles of the objects, the straight lines on which the antennas are disposed extend horizontally. In the case of a sensor for measuring elevation angles, conversely, the antennas would be disposed on vertical straight lines. Also possible is a two-dimensional antenna array with which both azimuth angles and elevation angles can be measured.

In the example shown, radar sensor 10 is operated using the time-multiplexed method, measurements with different fields of view being temporally interwoven with one another. At each point in time at most one of the transmitting antennas 12, 15 is active and is transmitting the transmitted signal. The activity phases of the individual antennas 12, 15 alternate cyclically with one another. FIG. 1 illustrates the situation in which only the bottom one of the two transmitting antennas 12 is active.

Figures 2, 3:
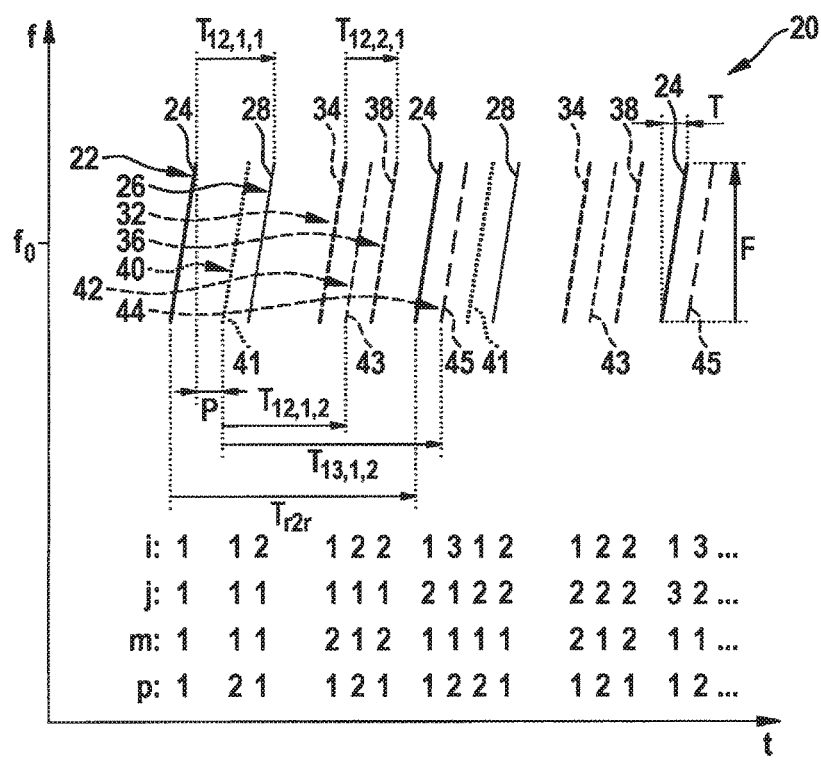
FIG. 2 shows a modulation pattern having seven sequences of similar ramps which are transmitted repeatedly.
FIG. 3 is a velocity/distance diagram having values, periodic at a predetermined interval, of the relative velocity of a radar target.

FIG. 2 shows the transmission frequency f of the transmitted signal 20 plotted against time t.

In the context of a measurement for the field of view of transmitting antennas 12, two respective sequences 22, 26 and 32, 36 of respective ramps 24, 28 and 34, 38 having identical ramp parameters, which are temporally interleaved with one another, are transmitted with each transmitting antenna 12. Ramps 24, 28 having the same ramp index j have a time offset T12,1,1 between sequences 22, 26. Ramps 34, 38 having the same ramp index j have a time offset T12,2,1 between sequences 32, 36. Ramps 24, 28 having the same ramp index j have a time offset T12,1,1 within sequence 22.

In the context of a measurement for the field of view of transmitting antenna 15, three sequences 40, 42, 44 of respective ramps 41, 43, and 45, which are temporally interleaved with one another, are transmitted with transmitting antenna 15. Between sequences 40, 42, 44, ramps 43 respectively have a time offset T12,1,2 with respect to ramps 41 having the same ramp index j, and ramps 45 each have a time offset T13,1,2 with respect to ramps 41 having the same ramp index.

In general, for the field of view p and a transmission switching state m corresponding to the selection of a transmitting antenna, the time offset of a further sequence i with respect to a first sequence is referred to here and hereinafter as T1$i,m,p$. For transmitting antenna 15 (p=2) m is always equal to 1.

Within each sequence, the successive ramps are shifted with respect to one another by a temporal spacing Tr2$r$. The temporal spacing Tr2$r$ is the same for all sequences of all fields of view. A pause P is present between each two successive ramps of a sequence.

In the example depicted in FIG. 2, the difference in ramp center frequency between successive ramps within a sequence is equal to zero. All the ramps therefore have the same frequency profile. The ramp center frequency corresponds here to the average transmission frequency $f_0$.

Figure 4:
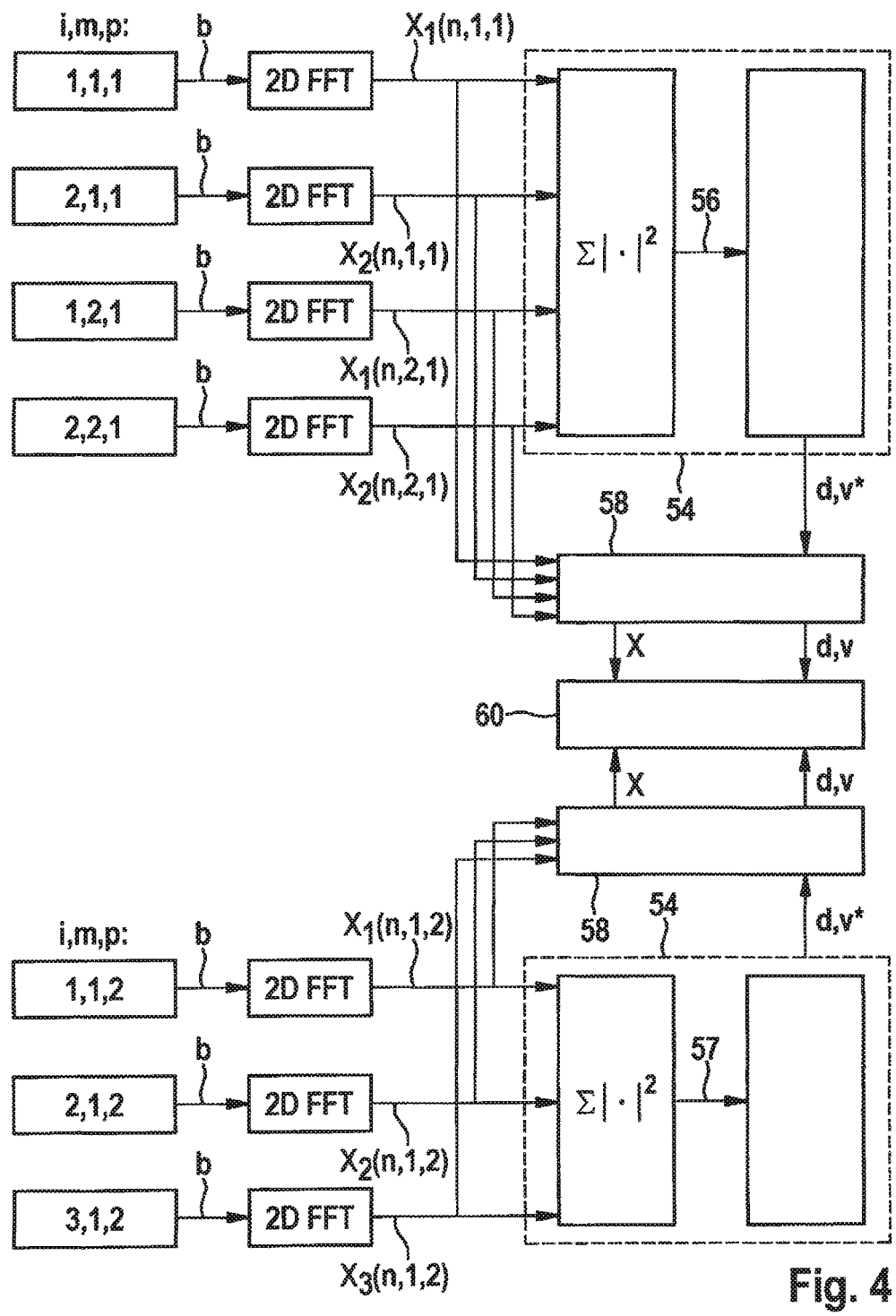
FIG. 4 is a more detailed block diagram of an evaluation device of an FMCW radar sensor.

FIG. 4 schematically shows a more detailed block diagram of the operations carried out by control and evaluation unit 16 in order to determine the relative velocity v, distance d, and object angle θ. To simplify the depiction, processing is depicted for only one reception channel n, corresponding to one respective antenna 14.

For each sequence i of one transmitting antenna m of one field of view p, the received, sampled baseband signals $b_{i,m,p}$ are each subjected to a two-dimensional Fourier transformation (2D-FFT). The first dimension corresponds to a transformation of the baseband signals obtained for the individual ramps. The second dimension corresponds to a transformation over the sequence of ramps, i.e. over the ramp index j. A two-dimensional spectrum $X_i(n,m,p)$ is therefore obtained for each sequence i in the reception channel n. For a respective field of view, the magnitudes of the respective transformations, i.e. the respective numbers of bins (sampling points or interpolation points), are preferably uniform for the first dimension for all spectra and uniform for the second dimension for all spectra.

Because of the relative velocity v of radar target 18 and the time offset T1$i,m,p$ between the partial measurements corresponding to individual sequences, a phase difference is obtained between the complex amplitudes (spectral values) of a peak $X_1(n,m,p)(k,l)$, $X_i(n,m,p)(k,l)$ occurring at the same position (k,l) in the two-dimensional spectra. The phase difference $\Delta\phi_{1i,m,p}$ is described by way of example in equation (2). Because of the relatively large time offset T1$i,m,p$, however, a determination of the phase difference between two partial measurements with the same transmitting antenna does not allow a direct inference as to the relative velocity v. The reason is that, because of the periodicity of the phases, the phase difference (or the two phase differences, for p=2) results in an ambiguity for the associated value of the relative velocity v.

In a first functional block 54, respective power spectra for each field of view p are calculated, from the spectra $X_i(n, m,p)$ that have been obtained, by squaring the absolute value of the respective spectral values. The power spectra are merged in point fashion, by summing or averaging, to yield an integrated two-dimensional power spectrum 56, 57.

The position in the power spectrum 56, 57 of a peak which corresponds to a radar target 18, which position is indicated here as bin k,l, corresponds to the position of the peak in the individual spectra $X_i(n,m,p)$. From the first dimension, corresponding to bin k of the position of the peak, a linear correlation between the relative velocity v and the distance d of the radar target is obtained in accordance with the FMCW equation k=2/c(dF+$f_0$vT), where c is the speed of light, F the ramp swing, T the ramp duration of an individual ramp, and $f_0$ the average transmission frequency. If the frequency difference of successive ramps of a sequence is equal to zero, the peak position in the second dimension l contains only information regarding the relative velocity v of the radar target.

FIG. 3 is a schematic diagram in which the relative velocity v is plotted against distance d. The linear relationship between v and d is plotted as a straight line. In the example, the information with regard to the relative velocity of the radar target obtained from sampling of the Doppler frequency is affected by an ambiguity in accordance with the predetermined interval according to equation (1). In addition to the v-d line that results in accordance with the frequency bin k, periodic values of the relative velocity v which were determined from the frequency bin l are depicted by dashed lines. The intersection points with the v-d line are marked. They correspond to possible value pairs (v, d) of the relative velocity and distance of radar target 18. The actual target whose velocity v is to be determined is marked by an X.

The ambiguity of the ascertained velocity v is now resolved separately for the fields of view p, in the manner explained below. The information item v* regarding the relevant periodic values of the relative velocity v is conveyed to a second functional block 58 along with the complex two-dimensional spectra $X_i(n,m,p)$ of the partial measurements.

In order to evaluate the measured phase difference, a control vector a(v) of an ideal measurement is calculated as a function of v in accordance with equation (3), which is written here, for l=2 sequences, as:

$$a(v, m, p) = \frac{1}{\sqrt{2}}\begin{pmatrix} 1 \\ e^{2\pi j\frac{2}{c}f_0 T_{12,m,p}v} \end{pmatrix}.$$

The measurement vector $a_{k,l}(n,m,p)$ is defined correspondingly; instead of the expected velocity-dependent complex values, the complex amplitudes (spectral values) at the position k,l of the peak of the two-dimensional spectra of the partial measurements are used as components of the vector, as indicated in equation (4). A normalization is accomplished in the definition of the likelihood function.

Based on the measurement vectors and the control vectors, a normalized likelihood function in the form of a relative velocity spectrum $S(v,p)$ is defined as:

$$S(v, p) = \frac{1}{\sum_{m=1}^{M_p} \sum_{n=1}^{N_p} |a_{k,j}^H(n, m, p)|^2} \sum_{m=1}^{M_p} \sum_{n=1}^{N_p} |a_{k,l}^H(n, m, p) a(v, m, p)|^2,$$

where $a^H_{k,l}(n,m,p)$ designates the Hermitian-adjoint vector to the measurement vector $a_{k,l}(n,m,p)$, i.e. a column vector in which the individual components are complexly conjugated with the components of the vector $a_{k,l}(n,m,p)$. The likelihood function thus corresponds, for a respective field of view p, to a normalized sum of the absolute value squares of the (complex) scalar products between the measurement vector and the control vector of the transfer channels, the summation being performed over the different transfer channels, each transfer channel referring to a combination of reception channel n and transmission switching state m.

The relative velocity spectrum $S(v,p)$ corresponds generally to a superimposition of periodic functions of the relative velocity v. The maxima of the likelihood function correspond to the most probable values of the parameter v. Considered in isolation, the relative velocity spectrum $S(v,p)$ is ambiguous. A maximum corresponds respectively to an, on average, optimum agreement between the ideal phase shifts resulting for the relevant value of v and the measured phase shifts in accordance with the measurement vectors. An evaluation of the function $S(v,p)$ is only necessary, however, at the points that correspond to those periodic values of the relative velocity v which were obtained from the evaluations according to the position of the peak in the bins (k,l). As an example, let it be assumed that a maximum agreement is obtained at the actual relative velocity v=0 m/s, where the function $S(v,p)$ assumes the expected maximum value of 1.

The ambiguity that results from the position of the peak can thus be resolved by way of the additional information from the phase relationship. An estimated value for the distance d, pertinent to the selected estimated value for the relative velocity v, is determined based on the linear correlation.

The second functional block 58 outputs the ascertained estimated values for the relative velocity v and the distance d, as well as the complex amplitudes X of the peaks for both fields of view p, to an angle estimator 60. For example, the estimated relative velocity v can be used to compensate for the phase shifts, caused by the relative velocity v, of the spectral values of the individual sequences with respect to a reference sequence.

The time signals (baseband signals) corresponding to the different sequences of ramps are therefore firstly processed separately. Detection of a radar target 18 then takes place in the power spectrum 56 recovered by non-coherent integration. The ambiguity of the velocity v is then resolved based on the detection and on the complex amplitudes at the position of the peak.

The non-coherent merger of the spectra to yield the power spectrum 56 is preferably carried out, as described, in common for all reception channels and all transmitting antennas. This improves peak detection.

In individual cases it can happen that two radar targets having different distances and different velocities have the same peak position (k,l) in the spectra 56, 57. The measured phase relationships then cannot be associated with a single relative velocity of a radar target. Evaluation device 16 can be configured to detect this type of measurement interference based on a deviation, exceeding a threshold value, of the maximum agreement, i.e. the maximum value of the relevant values of the relative velocity spectrum $S(v,p)$, from the expected maximum value of 1. Evaluation device 16 can then output an interference signal. A temporarily occurring multiple occupancy of a peak in the spectrum 56, 57 can also be recognized, however, from the fact that in the context of a tracking of detected objects carried out on the basis of the estimated values of v and d of a radar target 18, evaluation device 16 recognizes an incorrect detection over several measurement cycles.

Different modulation parameters of the ramps, for example different center frequencies, ramp slopes, temporal spacings $T_{2r}$, and/or time offsets $T_{1i,m,p}$, are preferably used for several successively performed radar measurements. Random multiple occupancies of peak positions can thereby be limited to individual cases.

Instead of a non-coherent merger of the individual spectra to yield the respective power spectrum 56, 57, it is also possible to group reception channels n together into one reception channel by digital beam forming. For example, for the respective field of view p and, if applicable, transmission switching state m, respective weighting factors are added coherently, i.e., in consideration of the phase, to the spectra or measurement vectors of N reception channels. The summations over n are then accordingly omitted from the equations for $S(v,p)$.

In addition to or instead of the spectra X of the baseband signals, the baseband signals b can also be outputted directly to angle estimator 60, or spectra calculated separately from the baseband signals b can be outputted to the angle estimator.

What is claimed is:

1. A method for localizing a radar target in which FMCW radar measurements are performed with transmitting antennas, wherein at least one of the transmitting antennas has a different field of view than at least one other of the transmitting antennas with respect to at least one of an aperture angle and a range, and wherein received signals are used for generating baseband signals, the method comprising:
   (a) in one measurement cycle, performing, for each of the fields of view of the transmitting antennas, a respective measurement, wherein:
      the respective measurement includes using frequency modulation to transmit at least two interleaved sequences of transmission signal ramps;
      for each of the sequences, a same respective time interval of the respective sequence offsets from each other respective ramps of all pairs of immediately temporally adjacent ones of the ramps of the respective sequence;
      for each of the sequences, a respective index value of each of the ramps of the sequence is a respective temporal position of the respective ramp relative to all other ramps of the respective sequence;
      the sequences of the of all of the fields of view are temporally interleaved with one another;
      for at least one of the fields of view, the sequences of the respective field of view result in at least two different, regularly recurring time offsets;
      each of the at least two different, regularly recurring time offsets:
         corresponds to a respective pair of the sequences of the respective field of view;

temporally offsets from each other the ramps of each pair of the ramps of the respective pair of the sequences that have a same one of the index values; and differs from the time intervals of the respective pair of the sequences;

(b) based on the baseband signals, calculating, by two-dimensional Fourier transformation and for each of the sequences, a respective two-dimensional spectrum, wherein each of the two-dimensional spectra includes:

a respective first dimension whose data points each corresponds to a respective single one of the ramps of the respective sequence to which the respective spectrum corresponds; and a respective second dimension whose data points each corresponds to a respective characteristic of a combination of the ramps of the respective sequence to which the respective spectrum corresponds; and (c) for each of the fields of view:

(1) determining, based on a position of a peak in at least one of the two-dimensional spectra calculated for the sequences of the respective field of view, a plurality of relative velocity values of a relative velocity of a radar target detected in the respective field of view, the determined relative velocity values being periodic with a predetermined velocity period;

(2) for each of two or more of the determined periodic relative velocity values:

(I) calculating a phase relationship based on the respective relative velocity value;

(II) determining a phase relationship between spectral values that are, respectively, in positions of the two-dimensional spectra of the respective field of view that correspond to each other; and (III) comparing to each other (i) the phase relationship calculated based on the respective relative velocity value and (ii) the determined phase relationship between the spectral values to obtain a comparison result; and (3) based on the comparison result, selecting one of the determined periodic relative velocity values as an estimated value for the relative velocity of the radar target detected in the respective field of view.

2. The method as recited in claim 1, wherein, for each of at least one of the fields of view, the sequences of the respective measurement performed for the respective field of view includes at least three sequences of transmission signal ramps that are transmitted by a same one of the antennas and that result in at least a first regularly recurring time offset that temporally offsets from each other the ramps of each pair of the ramps of the first and second of the at least three sequences that have a same one of the index values and a second regularly recurring time offset that temporally offsets from each other the ramps of each pair of the ramps of the first and third of the at least three sequences that have a same one of the index values.

3. The method as recited in claim 1, wherein, for each of at least one of the fields of view:

the respective measurement of the respective field of view is performed using a plurality of the antennas;

the method further includes switching between different transmission switching states in each of which at least two of the sequences of the respective field of view are transmitted and that differ with respect to which of the plurality of the antennas, by which the respective measurement of the respective field of view is performed, is active a first regularly recurring time offset that temporally offsets from each other immediately temporally adjacent ramps, of the sequences of a first of the switching states, which have a same one of the index values differs from a second regularly recurring time offset that temporally offsets from each other immediately temporally adjacent ramps, of the sequences of a second of the switching states, which have a same one of the index values.

4. The method as recited in claim 1, wherein:

for each of at least two of the fields of view, the respective measurement of the respective field of view is performed with a respective selection of several of the antennas so that different subsets of the antennas are used for different ones of the fields of view and is an angularly resolving measurement by which an angular position of a radar target is determined respectively for the respective field of view based on amplitudes and/or phases at positions of peaks in the two-dimensional spectra of the respective field of view.

5. The method as recited in claim 1, wherein:

for each of at least two of the fields of view, the respective measurement of the respective field of view is performed with a respective selection of several of the antennas so that different subsets of the antennas are used for different ones of the fields of view;

the method includes determining a coordinate position and an angular position of a radar target based on a respective search for peaks in the two-dimensional spectra of the fields of view the angular position is determined in a respective determination performed for a respective one of the fields of view based on at least one of amplitudes and phases at the peaks in the two-dimensional spectra of the respective field of view; and the method further comprises, in a case in which at least one of the coordinate position and angular position of the radar target has been determined, for one of the fields of view, to be in an overlap region of the respective field of view with another of the fields of view in which the radar target has not been determined to be positioned, using at least one of amplitudes and phases at positions corresponding to the radar target in the two-dimensional spectra of the other field of view in supplementary fashion in order to determine or correct the angular position.

6. The method as recited in claim 1, wherein, for each of at least one of the sequences, all of the ramps of the respective sequence have an identical ramp slope and identical ramp center frequencies.

7. The method as recited in claim 1, wherein, the ramps of all of the sequences of a same one of the fields of view have a same slope of change in frequency over time.

8. The method as recited in claim 1, wherein, for each of at least one of the fields of view, the two-dimensional spectra calculated separately for each of the sequences of the respective field of view are merged into a single merged two-dimensional spectrum, the relative velocity values determined for the respective field of view being determined based on the single merged two-dimensional spectrum.

9. The method as recited in claim 1, wherein the comparing is performed according to an equation of $$\Delta\varphi_{12} = 2\pi \frac{2}{c} f_0 T_{12} v;$$

the phase relationship calculated based on the respective relative velocity value is a phase difference $\Delta\phi_{12}$ expected to occur between phases of the spectral values of the spectra of the field of view;

$T_{12}$ is the regularly recurring time offset between the ramps of the sequences to which the spectra respectively correspond;

v is the respective determined periodic relative velocity value for which the comparing is performed;

c is the speed of light; and $f_0$ is an average transmission frequency of the ramps.

10. The method as recited in claim 9, wherein, for each of at least one of the respective fields of view:

for the each of the two or more of the periodic relative velocity values determined for the respective field of view, the comparing includes calculating a square of an absolute value of a complex scalar product $a^H_{k,l}a(v)$ of a measurement vector $a_{k,l}$;

a(v) is a control vector that is dependent on the respective relative velocity value v;

components of the measurement vector $a_{k,l}$ are spectral values at the position of the peak in each of the spectra of the respective field of view;

k,l represents the position of the peak in the spectra, with k representing the first dimension of the spectra and l representing the second dimension of the spectra;

$a^H_{k,l}$ is a Hermitian-adjoint vector to $a_{k,l}$;

components of the control vector a(v) are, except for a common normalization factor, the respective phase difference $\Delta\phi_{12}$ calculated based on the respective relative velocity value v; and a first one of the components of the control vector a(v) is, except for the common normalization factor, equal to 1.

11. The method as recited in claim 1, wherein:

the comparison result is a respective degree of an agreement S(v);

$$S(v) = \frac{1}{\sum_{(m,n)\in MN} |a^H_{k,l}(n,m)|^2} \sum_{(m,n)\in MN} |a^H_{k,l}(n,m)a(v,m)|^2;$$

MN represents pairwise combinations of reception channels n and transmission switching states m;

each of the switching states m corresponds to a respective selection of a respective subset of the antennas used for the measurements, so that different ones of the switching states m differ with respect to which of the antennas are used for transmission;

$a_{k,l}(n,m)$ is a measurement vector whose components are spectral values at the position of the peak in each of the spectra, the spectra each having been calculated separately for each of the pairwise combinations of the switching states m and reception channels n;

k,l represents the position of the peak in the spectra, with k representing the first dimension of the spectra and l representing the second dimension of the spectra;

$a_{k,l}^H(n,m)$ is a Hermitian-adjoint vector to $a_{k,l}(n,m)$;

the determined relative velocity values are determined respectively for respective ones of the switching states, so that at least some of the determined relative velocity values correspond to different ones of the switching states;

v represents respective ones of the determined relative velocity values; and a(v,m) is a control vector that is dependent on the determined relative velocity values v, with each component of the control vector corresponding to a respective one of the determined relative velocity values v for a respective one of the switching states m.

12. An FMCW radar sensor comprising:
a control and evaluation device; and
transmitting antennas;
wherein:
    at least one of the transmitting antennas has a different field of view than at least one other of the transmitting antennas with respect to at least one of an aperture angle and a range;
    received signals are used for generating baseband signals;
    the control and evaluation device is designed to perform a method for localizing a radar target in which FMCW radar measurements are performed with the transmitting antennas; and
    the method includes:
        (a) in one measurement cycle, performing, for each of the fields of view of the transmitting antennas, a respective measurement, wherein:
            the respective measurement includes using frequency modulation to transmit at least two interleaved sequences of transmission signal ramps;
            for each of the sequences, a same respective time interval of the respective sequence offsets from each other respective ramps of all pairs of immediately temporally adjacent ones of the ramps of the respective sequence;
            for each of the sequences, a respective index value of each of the ramps of the sequence is a respective temporal position of the respective ramp relative to all other ramps of the respective sequence;
            the sequences of the of all of the fields of view are temporally interleaved with one another;
            for at least one of the fields of view, the sequences of the respective field of view result in at least two different, regularly recurring time offsets;
            each of the at least two different, regularly recurring time offsets:
                corresponds to a respective pair of the sequences of the respective field of view;
                temporally offsets from each other the ramps of each pair of the ramps of the respective pair of the sequences that have a same one of the index values; and
                differs from the time intervals of the respective pair of the sequences;
        (b) based on the baseband signals, calculating, by two-dimensional Fourier transformation and for each of the sequences, a respective two-dimensional spectrum, wherein each of the two-dimensional spectra includes:
            a respective first dimension whose data points each corresponds to a respective single one of the ramps of the respective sequence to which the respective spectrum corresponds; and
            a respective second dimension whose data points each corresponds to a respective characteristic of a combination of the ramps of the respective sequence to which the respective spectrum corresponds; and
        (c) for each of the fields of view:
            (1) determining, based on a position of a peak in at least one of the two-dimensional spectra calculated for the sequences of the respective field of view, a plurality of relative velocity values of a relative velocity of a radar target detected in the respective field of view, the determined relative velocity values being periodic with a predetermined velocity period;

(2) for each of two or more of the determined periodic relative velocity values:

(I) calculating a phase relationship based on the respective relative velocity value;

(II) determining a phase relationship between spectral values that are, respectively, in positions of the two-dimensional spectra of the respective field of view that correspond to each other; and (III) comparing to each other (i) the phase relationship calculated based on the respective relative velocity value and (ii) the determined phase relationship between the spectral values to obtain a comparison result; and (3) based on the comparison result, selecting one of the determined periodic relative velocity values as an estimated value for the relative velocity of the radar target detected in the respective field of view.

* * * * *